United States Patent
Yao et al.

(10) Patent No.: US 7,420,829 B2
(45) Date of Patent: Sep. 2, 2008

(54) HYBRID CONTROL FOR DISCHARGE LAMPS

(75) Inventors: Kaiwei Yao, San Jose, CA (US); Wei Chen, Campbell, CA (US); David Meng, Los Altos, CA (US)

(73) Assignee: Monolithic Power Systems, Inc., San Jose, CA (US)

( * ) Notice: Subject to any disclaimer, the term of this patent is extended or adjusted under 35 U.S.C. 154(b) by 159 days.

(21) Appl. No.: 11/212,487

(22) Filed: Aug. 25, 2005

(65) Prior Publication Data

US 2007/0046353 A1    Mar. 1, 2007

(51) Int. Cl.
*H02M 7/5387*    (2007.01)
(52) U.S. Cl. .......................... 363/132; 363/98; 315/291
(58) Field of Classification Search ............. 363/16–20, 363/96, 97–98, 43, 138, 132, 48; 315/194, 315/199, 219, 209, 247, 291, 307
See application file for complete search history.

(56) References Cited

U.S. PATENT DOCUMENTS

| | | | |
|---|---|---|---|
| 4,651,060 A * | 3/1987 | Clark .......................... 315/199 |
| 5,528,192 A | 6/1996 | Agiman et al. |
| 5,615,093 A | 3/1997 | Nalbant |
| 5,619,402 A | 4/1997 | Liu |
| 5,757,173 A | 5/1998 | Agiman |
| 5,892,336 A | 4/1999 | Lin et al. |
| 5,923,129 A | 7/1999 | Henry |
| 5,930,121 A | 7/1999 | Henry |
| 6,104,146 A | 8/2000 | Chou et al. |
| 6,198,234 B1 | 3/2001 | Henry |
| 6,198,245 B1 | 3/2001 | Du et al. |
| 6,259,615 B1 | 7/2001 | Lin |
| 6,307,765 B1 | 10/2001 | Choi |
| 6,396,722 B2 | 5/2002 | Lin |
| 6,459,602 B1 | 10/2002 | Lipcsei |
| 6,469,922 B2 | 10/2002 | Choi |
| 6,501,234 B2 | 12/2002 | Lin et al. |
| 6,507,173 B1 | 1/2003 | Spiridon et al. |
| 6,515,881 B2 | 2/2003 | Chou et al. |
| 6,531,831 B2 | 3/2003 | Chou et al. |
| 6,559,606 B1 | 5/2003 | Chou et al. |
| 6,570,344 B2 | 5/2003 | Lin |
| 6,654,268 B2 | 11/2003 | Choi |
| 6,657,274 B2 | 12/2003 | Comeau et al. |
| 6,756,769 B2 | 6/2004 | Bucur et al. |
| 6,781,325 B2 | 8/2004 | Lee et al. |
| 6,809,938 B2 | 10/2004 | Lin et al. |
| 6,853,047 B1 | 2/2005 | Comeau et al. |
| 6,856,519 B2 | 2/2005 | Lin et al. |
| 6,864,669 B1 | 3/2005 | Bucur |
| 6,870,330 B2 | 3/2005 | Choi |
| 6,873,322 B2 | 3/2005 | Hartular |
| 6,876,157 B2 | 4/2005 | Henry |
| 6,888,338 B1 | 5/2005 | Popescu-Stanesti et al. |
| 6,897,698 B1 | 5/2005 | Gheorghiu et al. |

(Continued)

*Primary Examiner*—Rajnikant B. Patel
(74) *Attorney, Agent, or Firm*—Perkins Coie LLP; Zhou Lu

(57) ABSTRACT

Control methods and apparatus are disclosed for operating an inverter at resonant mode, where the inverter adapts its frequency to the resonant tank characteristics before a lamp is struck, and operates at fixed frequency after the lamp is struck. Disclosed embodiments combine the advantages of operation in fixed mode as well as the variable mode.

18 Claims, 10 Drawing Sheets

U.S. PATENT DOCUMENTS

| | | |
|---|---|---|
| 6,900,993 B2 | 5/2005 | Lin et al. |
| 6,906,497 B2 | 6/2005 | Bucur et al. |
| 6,919,694 B2 * | 7/2005 | Moyer et al. ................ 315/224 |
| 6,936,975 B2 | 8/2005 | Lin et al. |
| 6,946,806 B1 | 9/2005 | Choi |
| 6,979,959 B2 | 12/2005 | Henry |
| 6,999,328 B2 | 2/2006 | Lin |
| 7,023,709 B2 | 4/2006 | Lipcsei et al. |
| 7,057,611 B2 | 6/2006 | Lin et al. |
| 7,061,183 B1 | 6/2006 | Ball |
| 7,075,245 B2 | 7/2006 | Liu |
| 7,095,392 B2 | 8/2006 | Lin |
| 7,112,929 B2 | 9/2006 | Chiou |
| 7,112,943 B2 | 9/2006 | Bucur et al. |
| 7,120,035 B2 | 10/2006 | Lin et al. |
| 7,126,289 B2 | 10/2006 | Lin et al. |
| 7,141,933 B2 | 11/2006 | Ball |
| 7,157,886 B2 | 1/2007 | Agarwal et al. |
| 7,161,309 B2 | 1/2007 | Chiou et al. |
| 7,173,382 B2 | 2/2007 | Ball |
| 7,183,724 B2 | 2/2007 | Ball |
| 7,183,727 B2 | 2/2007 | Ferguson et al. |
| 7,187,139 B2 | 3/2007 | Jin |
| 7,187,140 B2 | 3/2007 | Ball |
| 7,190,123 B2 | 3/2007 | Lee |
| 7,200,017 B2 | 4/2007 | Lin |
| 2002/0180380 A1 | 12/2002 | Lin |
| 2005/0030776 A1 | 2/2005 | Lin |
| 2005/0093471 A1 | 5/2005 | Jin |
| 2005/0093482 A1 | 5/2005 | Ball |
| 2005/0093484 A1 | 5/2005 | Ball |
| 2005/0151716 A1 | 7/2005 | Lin |
| 2005/0174818 A1 | 8/2005 | Lin et al. |
| 2005/0225261 A1 | 10/2005 | Jin |
| 2006/0202635 A1 | 9/2006 | Liu |
| 2006/0232222 A1 | 10/2006 | Liu et al. |
| 2006/0279521 A1 | 12/2006 | Lin |
| 2007/0001627 A1 | 1/2007 | Lin et al. |
| 2007/0046217 A1 | 3/2007 | Liu |
| 2007/0047276 A1 | 3/2007 | Lin et al. |
| 2007/0085493 A1 | 4/2007 | Kou et al. |

* cited by examiner

HYBRID CONTROL FOR DISCHARGE LAMPS

TECHNICAL FIELD

The embodiments described below relate, in general, to power inverters and, in particular, to the control of inverters powering discharge lamps.

BACKGROUND

A CCFL (Cold Cathode Fluorescent Lamp) inverter with switching frequency adapted to the resonant tank characteristics will produce a very high efficiency power conversion and provide reliable lamp striking and open lamp regulation. However, this design approach also produces wide variations of switching frequencies when the input voltage, lamp current, and LCD panels change. If the frequency variation range is too wide, there is potential for EMI interference between the LCD panel and the CCFL inverter.

While it is desirable to drive CCFLs with fixed frequencies, the resonant tank characteristics of the inverter can be greatly influenced by the panel assembly which makes it difficult to achieve reliable ignition and open lamp operation.

DETAILED DESCRIPTION

Various embodiments of the invention will now be described. The following description provides specific details for a thorough understanding and enabling description of these embodiments. One skilled in the art will understand, however, that the invention may be practiced without many of these details. Additionally, some well-known structures or functions may not be shown or described in detail, so as to avoid unnecessarily obscuring the relevant description of the various embodiments.

The terminology used in the description presented below is intended to be interpreted in its broadest reasonable manner, even though it is being used in conjunction with a detailed description of certain specific embodiments of the invention. Certain terms may even be emphasized below; however, any terminology intended to be interpreted in any restricted manner will be overtly and specifically defined as such in this Detailed Description section.

The description of the embodiments of the invention and their applications as set forth herein is illustrative and is not intended to limit the scope of the invention. Variations and modifications of the embodiments are possible and practical alternatives to, or equivalents of the various elements of, the embodiments disclosed herein and are known to those of ordinary skill in the art. Such variations and modifications of the disclosed embodiments may be made without departing from the scope and spirit of the invention.

The embodiments described below disclose control schemes for operating inverters at resonant mode, where the inverters adapt their frequencies to the resonant tank characteristics before the lamp is struck and operate at fixed frequency after the lamp is struck.

Figure 1:
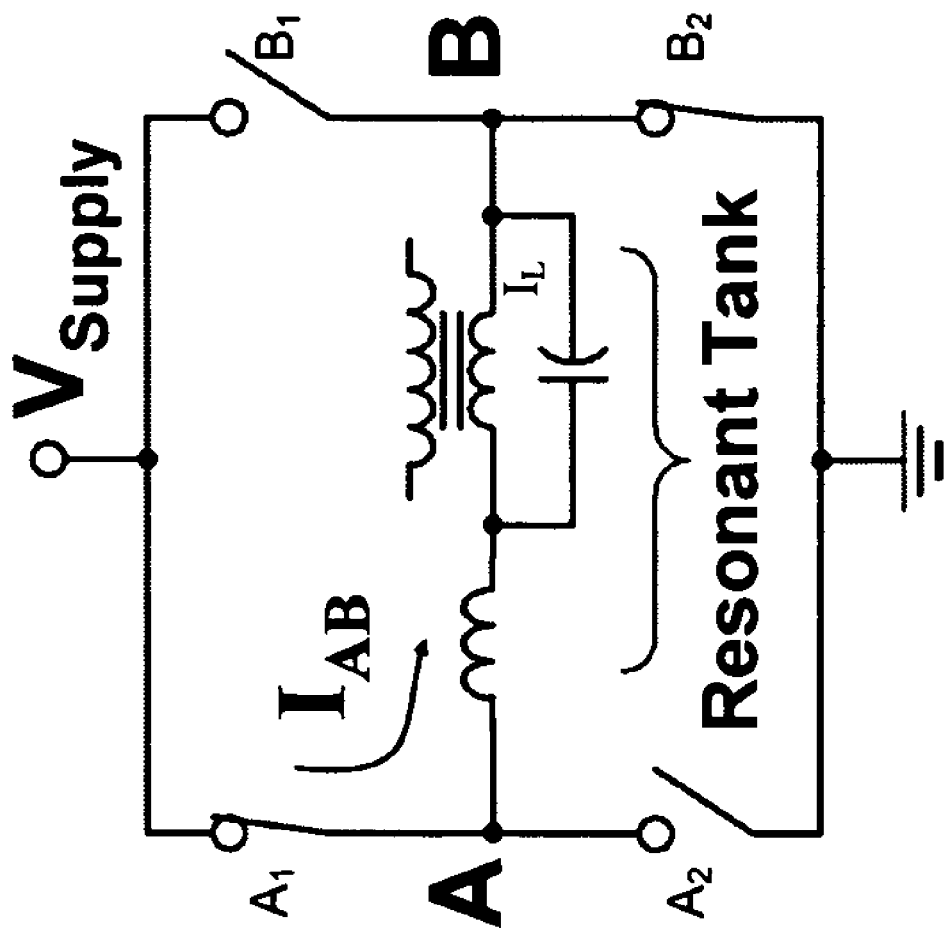
FIG. 1 illustrates a full-bridge inverter widely used with CCFLs.
Figure 2:
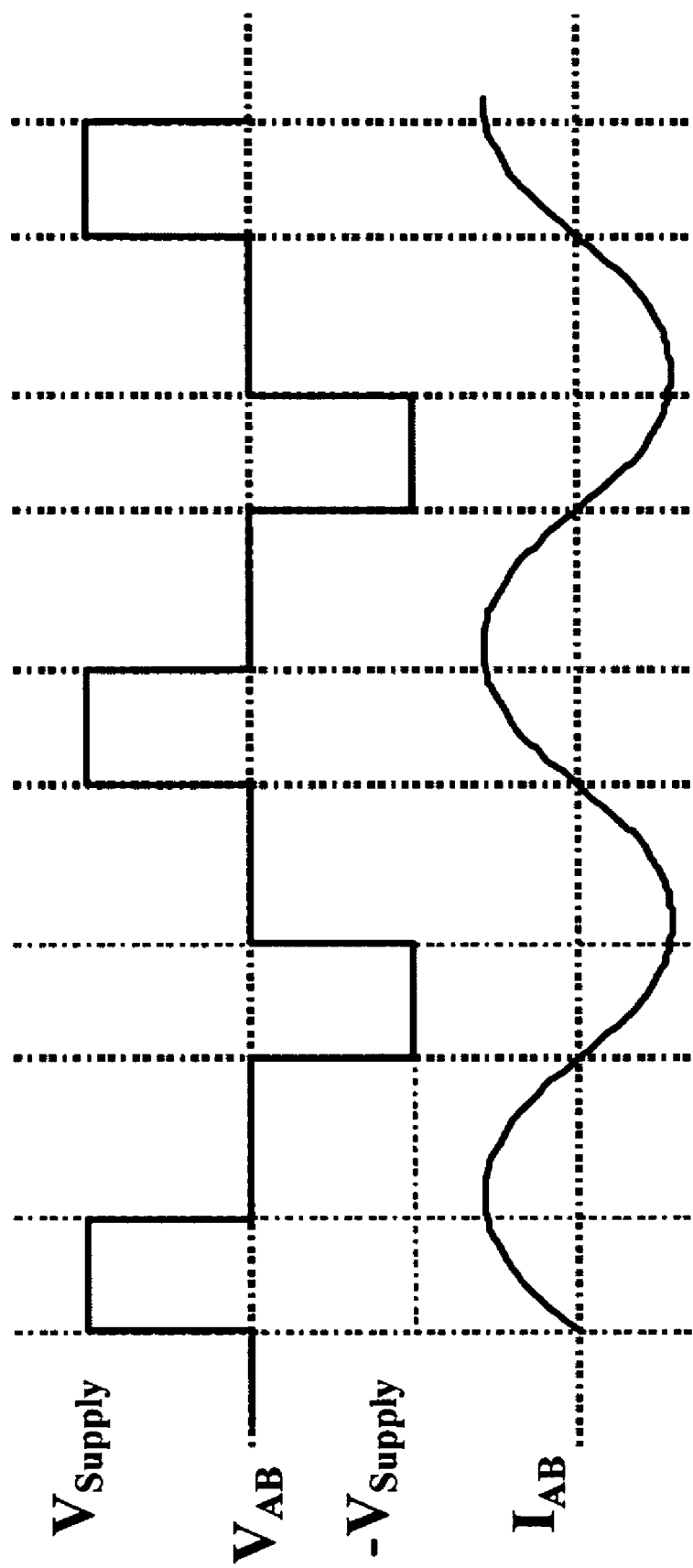
FIG. 2 illustrates a switch-turn-on timing-diagram resulting from a variable switching frequency control method.

FIG. 1 shows a widely used full-bridge inverter for CCFLs. IL is the resonant current in the transformer's primary winding. For the variable frequency control method, appropriate switches are turned on whenever IL crosses zero. FIG. 2 depicts such an arrangement where at zero-crossings of the IAB, either A1 and B2, or A2 and B1 are "on." One of the disadvantages of this control method is that the frequency variable range is very large for a wide DC input voltage range, which may cause noise in the LCD display because of the beat frequency noise. Another disadvantage is that the switching frequency is low under a low input voltage, which may cause resonant frequency hums and make the system unstable. Consequently, this control scheme does not work well with more than 35% duty cycle and it will be difficult to further improve the inverter efficiency. However, some of the advantages of this control scheme are: good open lamp voltage regulation, no start up lamp current spikes, smooth and soft on and off operation for lamp current under burst-mode operation.

Figure 3:
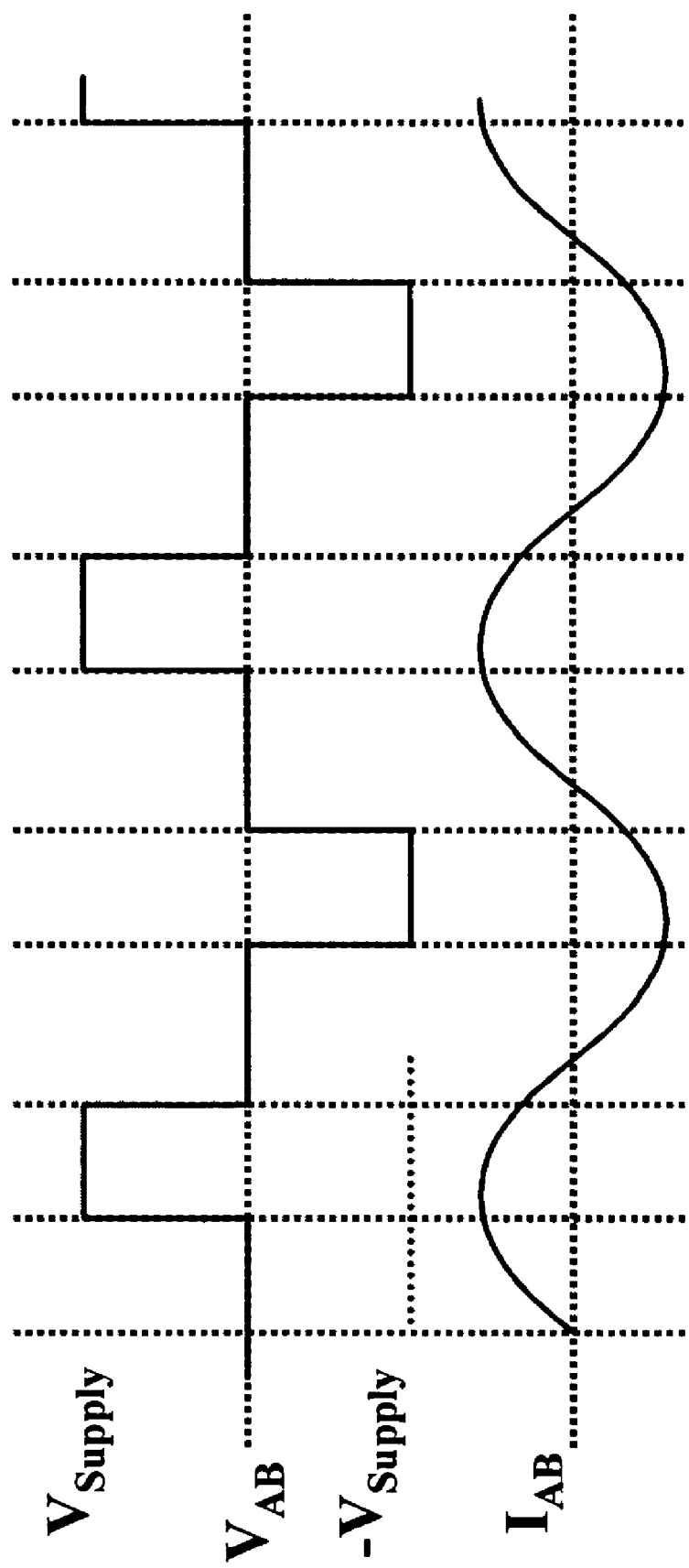
FIGS. 3 and 4 illustrate switch-turn-on timing-diagrams resulting from a fixed switching frequency control method, wherein the switch-turn-on time is set by a clock.
Figure 4:
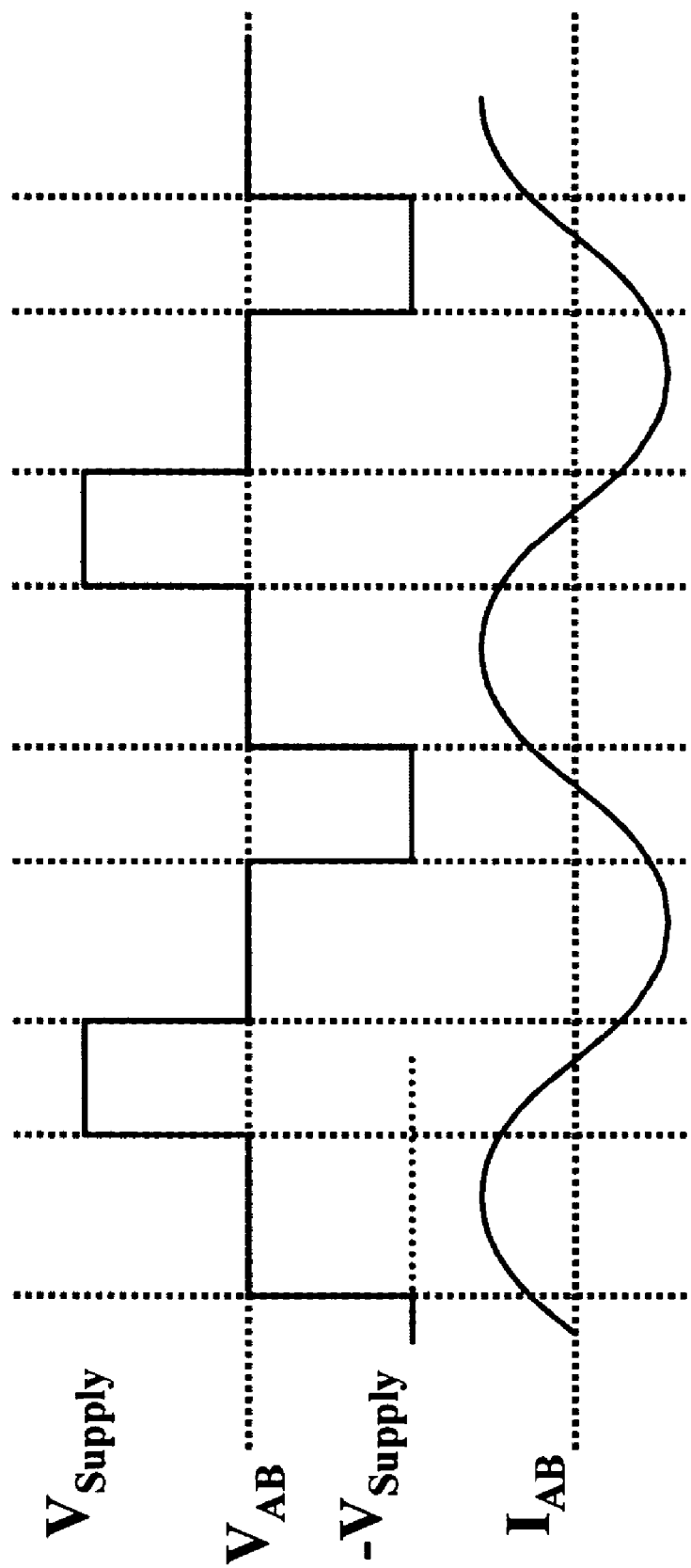

For the fixed switching frequency control method, the switch turn-on time is set by the clock and the switching frequency is fixed by designed parameters. One of the disadvantages of this control method is that there is no control of the phase relationship between the voltage and the resonant current. Situations illustrated in FIGS. 3 and 4 can happen at different input voltage levels and will cause poor crest factor and will hurt the lamp efficiency. It is also very easy with this arrangement to cause lamp start-up current spikes. For the same reason, it is not easy to achieve open-lamp voltage regulation. However, some of the advantages of this control scheme are: no resonant frequency hum, 50% duty cycle workable with better efficiency, controlled switching frequency to avoid interference between the LCD panel and the CCFL inverter.

The disclosed hybrid control methods combine the advantages of both the variable frequency and the fixed frequency control methods. The fixed frequency (oscillator clock frequency) is set higher than the loaded tank resonant frequency (lamp is on) in normal operation but lower than the unloaded tank resonant frequency in an open lamp condition (lamp is off). These settings allow the tank voltage to lead the tank current during normal operation and the tank voltage to lag the tank current during open-lamp condition. "Leading" and "lagging" is determined by a phase detector, which will be explained in detail below.

During normal operation, the tank voltage leads the tank current and the inverter operates in fixed switching frequency. Under open-lamp condition, the tank current tends to lead the tank voltage. In this case, the oscillator clock can be forced to run faster so that the switching frequency is increased. The resonant tank will keep a fixed phase relationship between the tank current and the tank voltage and it operates under variable frequency. The lamp clock frequency is shifted up to the unloaded tank frequency in open lamp condition. When the lamp is turned on, the inverter will operate in variable frequency during the lamp ignition period and in fixed frequency during the steady-state period.

Method: 1: Falling-Edge Modulation

Figure 5:
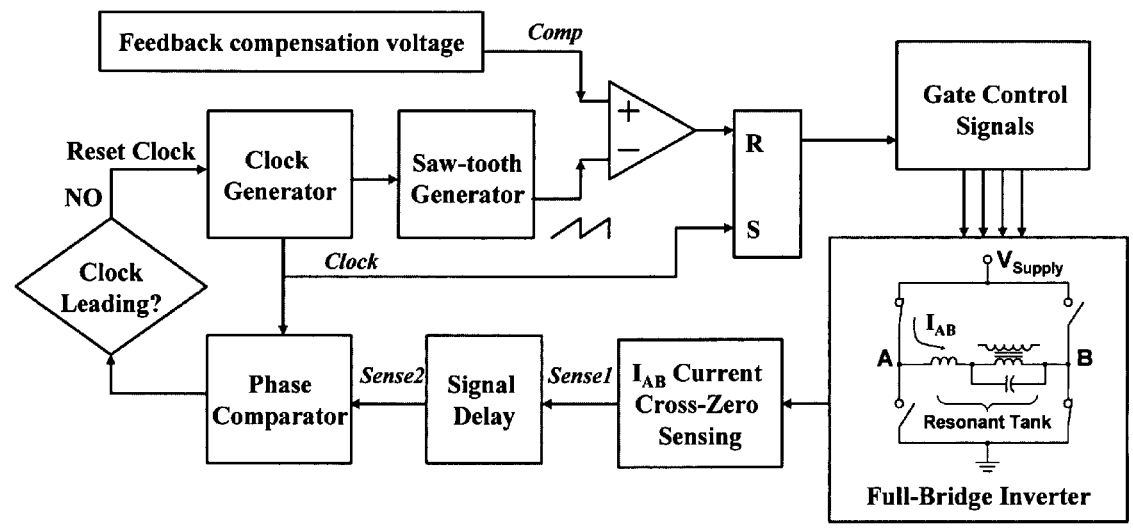
FIG. 5 shows a block diagram of an implementation example of a control method in accordance with an embodiment of the invention.
Figure 6:
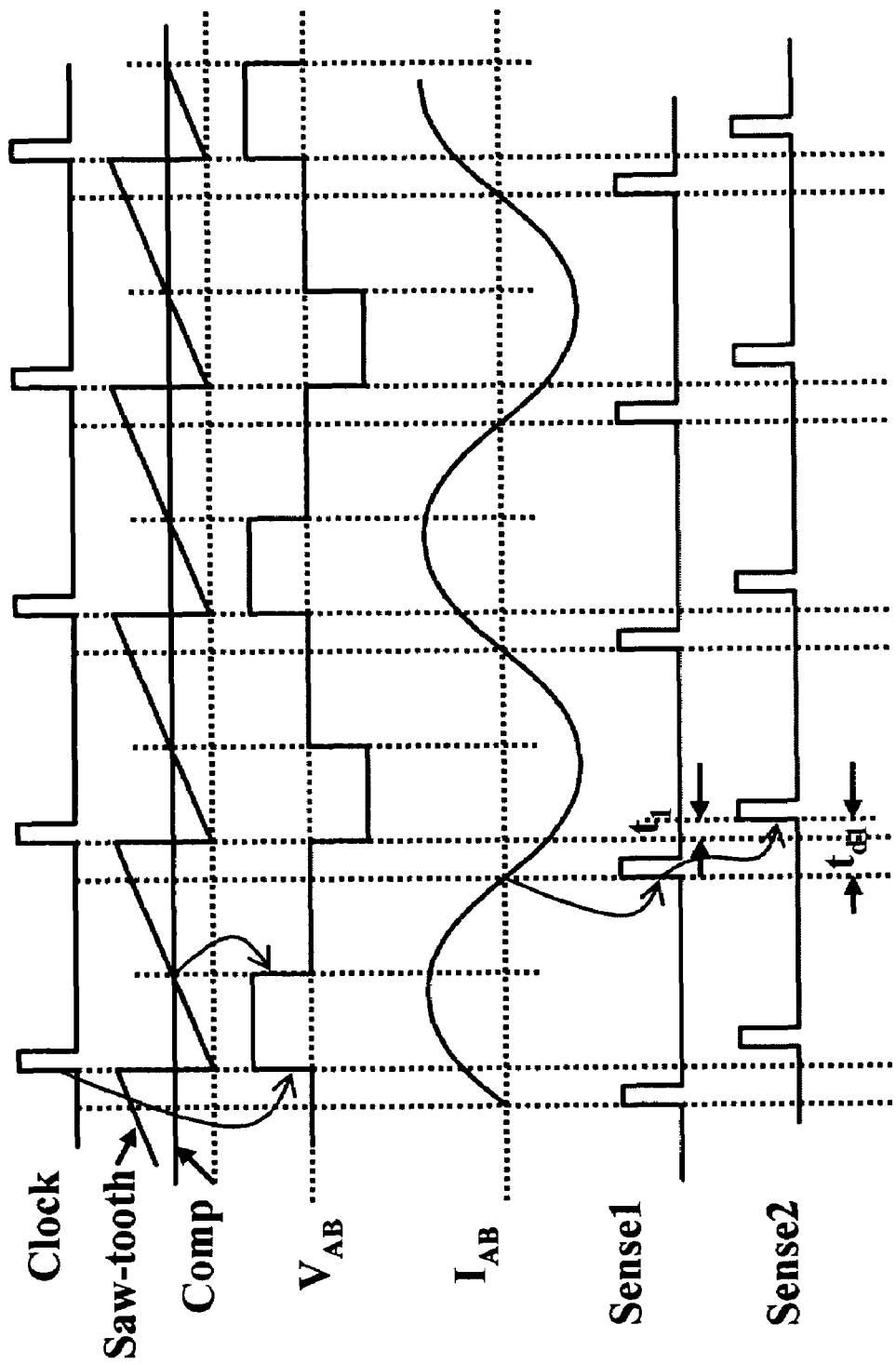
FIG. 6 illustrates some signals of the implementation example of FIG. 5, while operating under fixed switching frequency condition.

FIG. 5 shows the block diagram of an implementation example of a control method in accordance with an embodiment of the present invention. FIG. 6 illustrates some of the signals of the implementation example of FIG. 5, while operating under fixed switching frequency condition. Sense1 is the output of the $I_{AB}$ current zero-crossing detection circuit. Sense2 is the delayed Sense1 signal, wherein the delay time is $t_{d1}$. When the fixed frequency (oscillator frequency) is slightly at the inductive side of the resonant tank, clock is leading the Sense2 signal, where the leading time is shown by $t_1$ in FIG. 6. The delay time $t_{d1}$ allows the tank current to be more "in-phase" with the tank voltage, and thus improve efficiency at fixed frequency.

Figure 7:
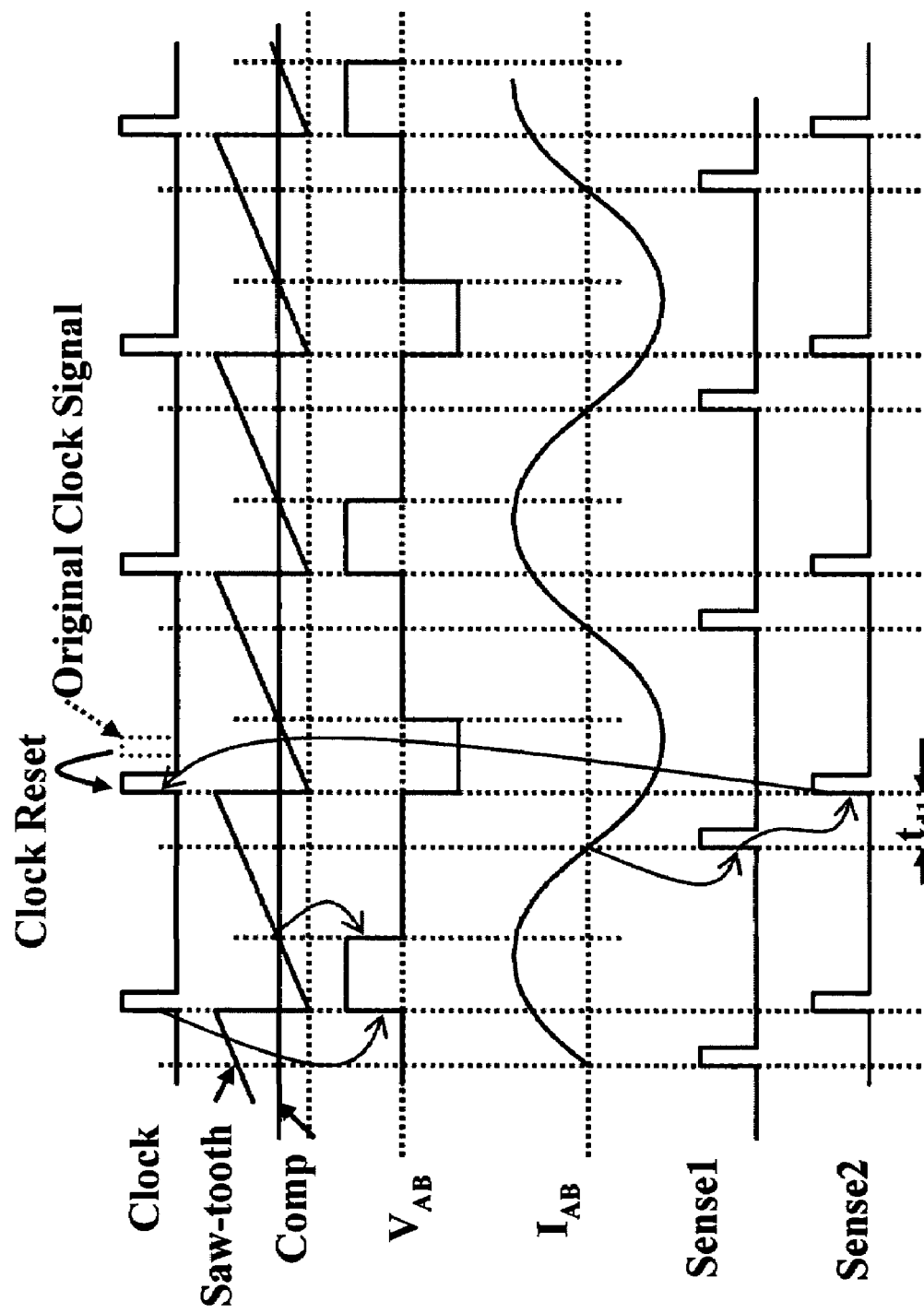
FIG. 7 illustrates some signals of the implementation example of FIG. 5, while operating under variable switching frequency condition.

FIG. 7 illustrates some of the signals of the implementation example of FIG. 5, operating under variable switching frequency condition. In FIG. 7, if clock signal is lagging the Sense2 signal, the rising edge of Sense2 will reset the clock. In this configuration, appropriate switches will be turned on after a delay time of $t_{d1}$ from a current zero-crossing. The delay time $t_{d1}$ can be fixed or adaptive.

Method 2: Leading-Edge Modulation

Figure 8:
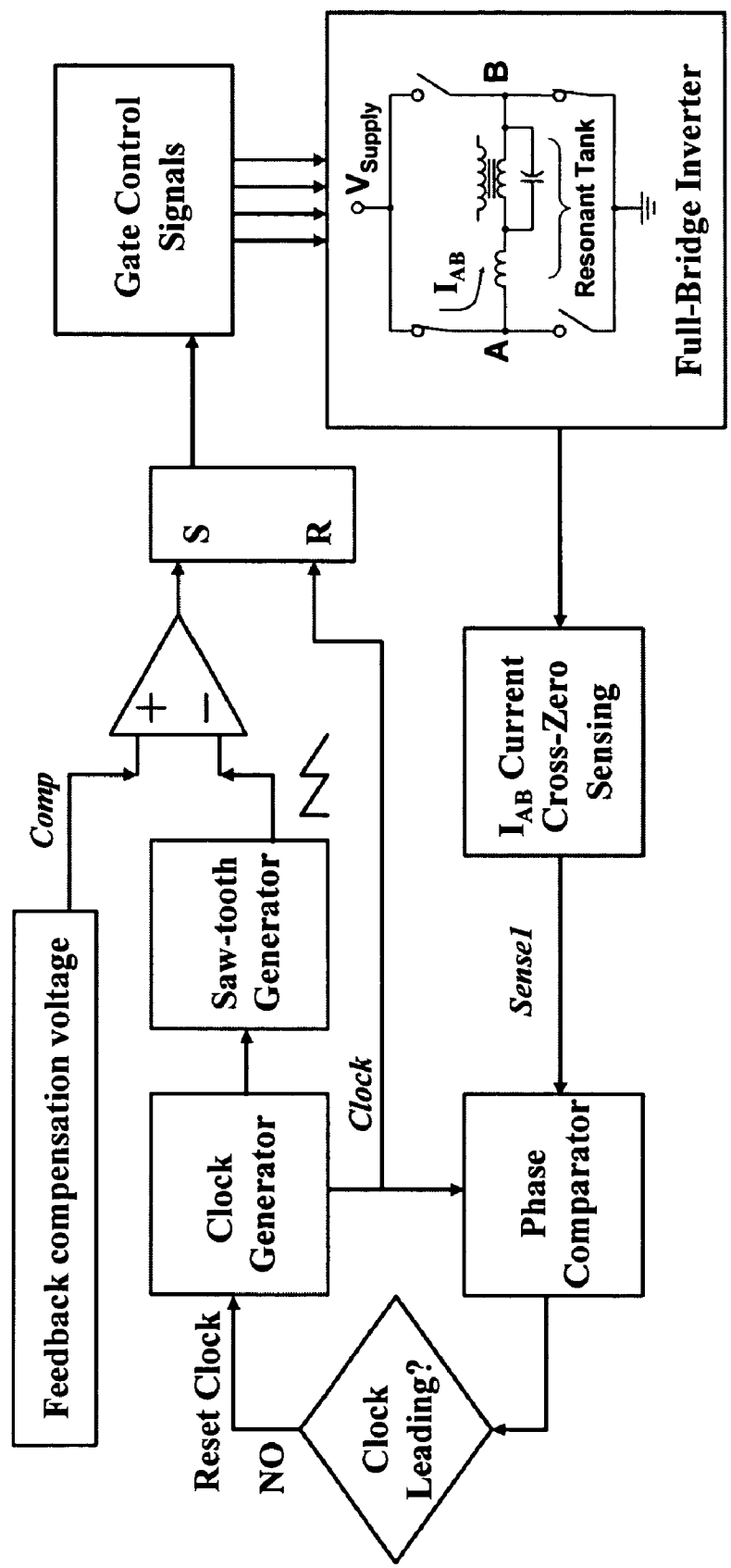
FIG. 8 shows a block diagram of an implementation example of a control method in accordance with another embodiment of the invention.
Figure 9:
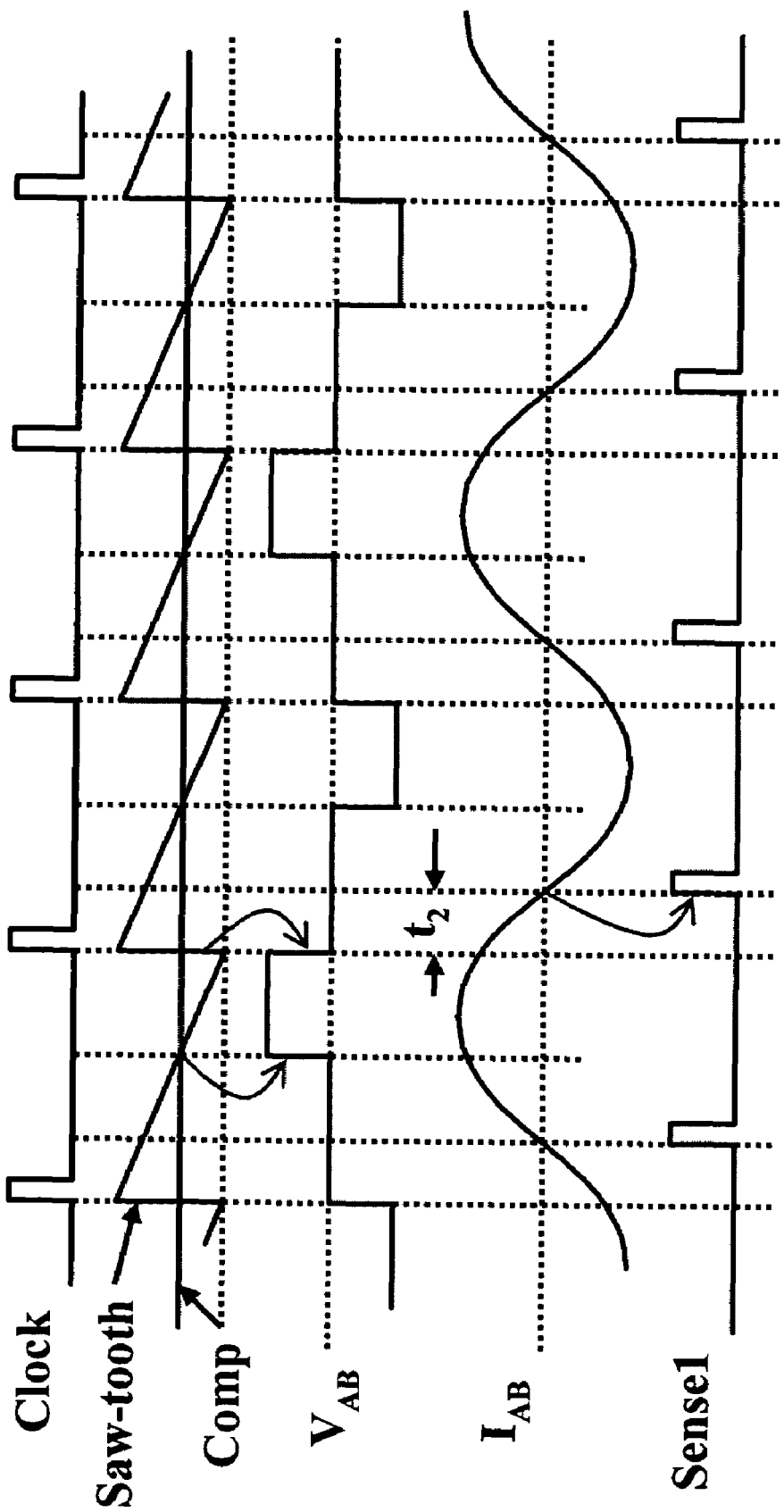
FIG. 9 illustrates some signals of the implementation example of FIG. 8, while operating under fixed switching frequency condition.

FIG. 8 shows the block diagram of another implementation example of a control method in accordance with an embodiment of the present invention. FIG. 9 illustrates some of the signals of the implementation example of FIG. 8, while operating under fixed switching frequency condition. Here, Sense1 is the output of the $I_{AB}$ current zero-crossing detection circuit (there can also be some delay). When the fixed frequency (oscillator frequency) is slightly at the capacitive side of the resonant tank, clock is leading the signal Sense1. In FIG. 8 the leading time is shown by $t_2$.

Figure 10:
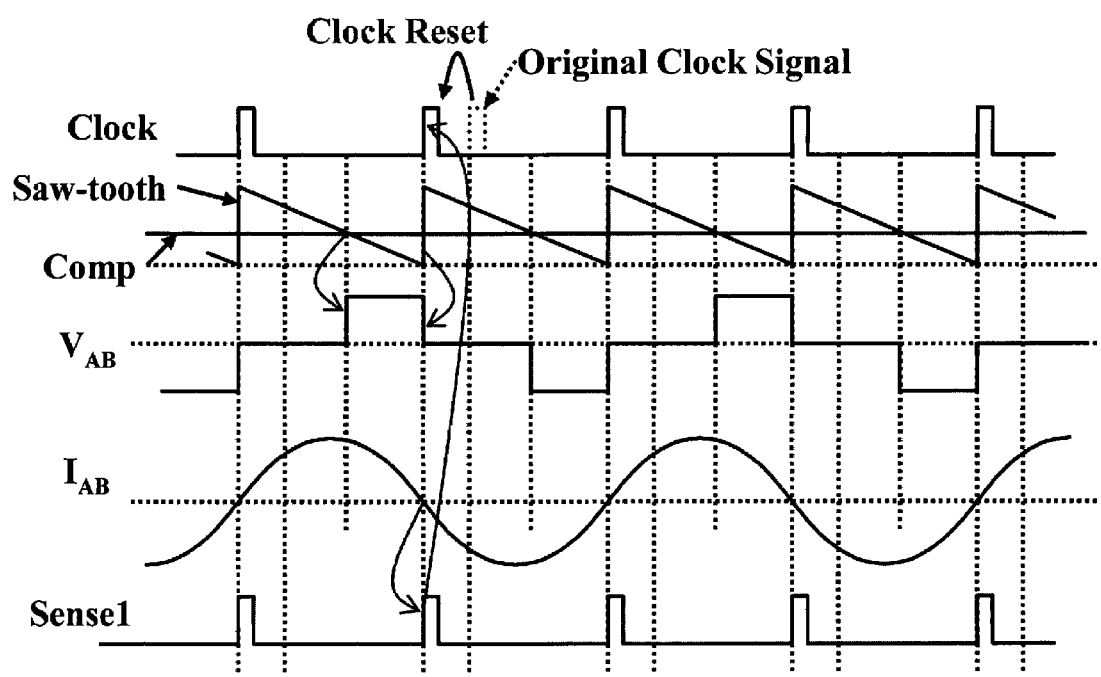
FIG. 10 illustrates some signals of the implementation example of FIG. 8, while operating under variable switching frequency condition.

FIG. 10 illustrates some of the signals of the implementation example of FIG. 8, while operating under variable switching frequency condition. In FIG. 10, if clock signal is lagging Sense1 signal, the rising edge of Sense1 will reset the clock, and the switching frequency automatically tracks the natural resonant frequency of the tank. In this configuration, appropriate switches will be turned off at the current zero-crossing point, which will not allow the circuit to operate within the capacitive side of the resonant tank.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof.

Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize.

The teachings of the invention provided herein can be applied to other systems, not necessarily the system described above. The elements and acts of the various embodiments described above can be combined to provide further embodiments.

Changes can be made to the invention in light of the above Detailed Description. While the above description describes certain embodiments of the invention, and describes the best mode contemplated, no matter how detailed the above appears in text, the invention can be practiced in many ways. Details of the compensation system described above may vary considerably in its implementation details, while still being encompassed by the invention disclosed herein.

As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the invention are presented below in certain claim forms, the inventors contemplate the various aspects of the invention in any number of claim forms. Accordingly, the inventors reserve the right to add additional claims after filing the application to pursue such additional claim forms for other aspects of the invention.

We claim:

1. An apparatus for controlling a full-bridge inverter that includes a resonant tank, the apparatus comprising:
   a zero-crossing signal generator for generating signals when a current in an inductor of the resonant tank becomes zero;
   a clock signal generator;
   a phase comparator for comparing phases of zero-crossing signals with clock signals;
   a clock resetting signal generator, wherein a reset signal is generated, based on phase comparator signals, to reset the clock if clock signals do not lead zero-crossing signals; and
   a switching signal generator for controlling the full-bridge switches, wherein switching signals are generated using the clock signals and a reference signal.

2. The apparatus of claim 1, wherein:
   if clock leads the zero-crossing signal the inverter operates under fixed switching frequency condition; and
   if the clock signal lags the zero-crossing signal, a rising edge of the zero-crossing signal resets the clock, and switching frequency automatically tracks resonant frequency of the tank and the inverter operates under variable switching frequency condition.

3. The apparatus of claim 1, wherein the switching signal generator comprises:
   a saw-tooth signal generator, using clock signals as input;
   a comparator for comparing saw-tooth signals with a reference signal;
   a flip-flop using comparator and clock output signals to trigger control of the full-bridge switches; and
   a multiple gate control signal generator for controlling individual switches of the full-bridge, wherein the multiple control signals are generated using the flip-flop output.

4. The apparatus of claim 3, wherein the flip-flop is an RS flip-flop.

5. The apparatus of claim 1, wherein a delay generator is inserted between the zero-crossing signal generator and the phase comparator to provide the phase comparator with a delayed version of zero-crossing signals.

6. The apparatus of claim 5, wherein:
   if clock leads the delayed zero-crossing signal the inverter operates under fixed switching frequency condition; and
   if the clock signal is lagging the delayed zero-crossing signal, a rising edge of the delayed zero-crossing signal will reset the clock and inverter operates under variable switching frequency condition.

7. The apparatus of claim 1, wherein the inductor is a primary winding of a transformer.

8. A method for controlling a full-bridge inverter that includes a resonant tank, the method comprising:
   generating zero-crossing signals when a current in an inductor of the full-bridge becomes zero;
   generating clock signals;
   comparing phases of zero-crossing signals and clock signals;
   resetting clock signals, using comparison results, if clock signals do not lead zero-crossing signals; and
   controlling the full-bridge switches using clock signals and a reference signal.

9. The method of claim 8, wherein:
   if clock leads the zero-crossing signal the inverter operates under fixed switching frequency condition; and
   if the clock signal lags the zero-crossing signal, a rising edge of the zero-crossing signal resets the clock, and switching frequency automatically tracks resonant frequency of the tank and the inverter operates under variable switching frequency condition.

10. The method of claim 8, wherein the phase comparison is between clock signals and a delayed version of zero-crossing signals.

11. The method of claim 10, wherein:
    if clock leads the delayed zero-crossing signal the inverter operates under fixed switching frequency condition; and
    if the clock signal is lagging the delayed zero-crossing signal, a rising edge of the delayed zero-crossing signal will reset the clock and inverter operates under variable switching frequency condition.

12. The method of claim 8, wherein controlling the full-bridge switches comprises:
    generating saw-tooth signals using clock signals;
    comparing saw-tooth signals with a reference signal;
    registering and clocking out comparison results; and
    generating multiple gate control signals, using the clocked comparison results, for controlling individual switches of the full-bridge.

13. The apparatus of claim 8, wherein the full-bridge inductor is a primary winding of the resonant tank transformer.

14. An apparatus for controlling a full-bridge inverter that includes a resonant tank, the apparatus comprising:
    means for generating zero-crossing signals when a current in an inductor of the full-bridge becomes zero;
    means for generating clock signals;
    means for comparing phases of zero-crossing signals and clock signals;
    means for resetting clock signals if clock signals do not lead zero-crossing signals; and
    means for controlling the full-bridge switches using clock signals and a reference signal.

15. The apparatus of claim 14, wherein:
    if clock leads the zero-crossing signal the inverter operates under fixed switching frequency condition; and
    if the clock signal lags the zero-crossing signal, a rising edge of the zero-crossing signal resets the clock, and switching frequency automatically tracks resonant frequency of the tank and the inverter operates under variable switching frequency condition.

16. The apparatus of claim 14, wherein a delay generator means is inserted between the zero-crossing signal generator and the phase comparator for providing the phase comparator with a delayed version of zero-crossing signals.

17. The apparatus of claim 16, wherein:
    if clock leads the delayed zero-crossing signal the inverter operates under fixed switching frequency condition; and
    if the clock signal is lagging the delayed zero-crossing signal, a rising edge of the delayed zero-crossing signal will reset the clock and inverter operates under variable switching frequency condition.

18. The apparatus of claim 14, wherein the full-bridge inductor is a primary winding of the resonant tank transformer.

* * * * *